US009970433B2

(12) United States Patent
Marioni (10) Patent No.: US 9,970,433 B2
(45) Date of Patent: May 15, 2018

(54) ENHANCED METHOD FOR CONTROLLING A PUMPING STATION WITHIN A FLUID CIRCULATION SYSTEM, RELATED CIRCULATION SYSTEM AND PUMPING STATION FOR REALIZING SAID METHOD

(71) Applicant: Askoll Holding S.r.l. a socio unico, Povolaro di Dueville (Vicenza) (IT)

(72) Inventor: Elio Marioni, Dueville (IT)

(73) Assignee: Taco Italia S.r.l., Sandrigo (Vicenza) (IT)

( * ) Notice: Subject to any disclaimer, the term of this patent is extended or adjusted under 35 U.S.C. 154(b) by 400 days.

(21) Appl. No.: 14/629,564

(22) Filed: Feb. 24, 2015

(65) Prior Publication Data

US 2015/0240801 A1    Aug. 27, 2015

(30) Foreign Application Priority Data

Feb. 25, 2014    (EP) .................................... 14425018

(51) Int. Cl.
  *F04B 49/06*    (2006.01)
  *G05B 11/01*    (2006.01)
  (Continued)

(52) U.S. Cl.
  CPC ............ *F04B 49/065* (2013.01); *F04B 49/20* (2013.01); *F04D 15/0066* (2013.01); *G05B 11/01* (2013.01); *F04D 15/0005* (2013.01)

(58) Field of Classification Search
  CPC ............... F04D 27/001; F04D 15/0066; F04D 15/0005; F04B 49/065; F04B 49/20; G05B 11/01
  (Continued)

(56) References Cited

U.S. PATENT DOCUMENTS 3,551,072 A * 12/1970 Zimmerly ............... H02P 29/40
                                                                 417/45
3,555,844 A *  1/1971 Fleckenstein et al. ....................
                                                          F04D 27/0207
                                                                62/217
(Continued)

FOREIGN PATENT DOCUMENTS

EP        0 150 068 A2    7/1985
EP          0150068 A2 *  7/1985    ......... F04D 15/0066
(Continued)

OTHER PUBLICATIONS

European Search Report issued in connection with EP14425018.0.

*Primary Examiner* — Kenneth M Lo
*Assistant Examiner* — Mohammed Shafayet
(74) *Attorney, Agent, or Firm* — Akerman LLP (57) ABSTRACT

Method for automatically controlling a pumping station of a fluid circulation system with flowrate control valves, comprising the following control steps which are cyclically repeated: (b) driving said pumping station in accordance with a set curve belonging to a group of predefined driving curves; (c) monitoring over time the variation in flowrate of fluid circulating in the system at the pumping station, or a parameter related thereto; (d) if, during the monitoring step (c), the variation in flowrate exceeds or falls below a control threshold and if said condition is maintained for a stabilization time, (e) modifying the set driving curve, replacing it with another curve from the plurality of driving curves; and (f) reinitializing the monitoring step (c) from a new working point reached by the pumping station.

14 Claims, 9 Drawing Sheets

(51) Int. Cl.
  *F04D 15/00* (2006.01)
  *F04B 49/20* (2006.01)
(58) Field of Classification Search
  USPC .................. 417/19, 12, 20, 43, 45; 700/282
  See application file for complete search history.

(56) References Cited

U.S. PATENT DOCUMENTS

| | | | | |
|---|---|---|---|---|
| 3,994,623 A * | 11/1976 | Rutshtein | ............ | F04D 27/0284 417/19 |
| 4,177,649 A * | 12/1979 | Venema | ................ | F25B 49/022 417/43 |
| 4,309,871 A * | 1/1982 | Venema | .................... | F02C 9/28 417/43 |
| 4,526,513 A * | 7/1985 | Bogel | ..................... | F04B 49/02 417/18 |
| 4,678,404 A * | 7/1987 | Lorett | ................ | F04D 15/0066 415/901 |
| 4,805,118 A * | 2/1989 | Rishel | ....................... | G01L 3/26 340/606 |
| 5,240,380 A * | 8/1993 | Mabe | .................. | F04D 15/0066 417/43 |
| 5,267,441 A * | 12/1993 | Devier | ................. | E02F 9/2221 60/452 |
| 5,634,772 A * | 6/1997 | Kawaguchi | .............. | F04D 13/04 417/22 |
| 6,481,973 B1 * | 11/2002 | Struthers | ................. | F04D 7/045 417/36 |
| 6,640,617 B2 * | 11/2003 | Schob | ................... | A61M 1/101 73/54.01 |
| 6,918,307 B2 * | 7/2005 | Ohlsson | .............. | F04D 15/0088 415/17 |
| 6,939,109 B2 * | 9/2005 | Takahashi | .............. | F04B 49/065 417/14 |
| 7,591,777 B2 * | 9/2009 | LaRose | ................. | A61M 1/101 600/16 |
| 7,690,897 B2 * | 4/2010 | Branecky | ................ | F04D 15/00 417/44.11 |
| 8,136,271 B2 * | 3/2012 | Sakai | ...................... | F04B 49/06 318/34 |
| 8,177,519 B2 * | 5/2012 | Branecky | ............ | F04D 15/0066 417/44.11 |
| 8,282,359 B2 * | 10/2012 | Ayre | ...................... | A61M 1/101 417/43 |
| 8,690,549 B2 * | 4/2014 | Aarestrup | ............... | F04D 13/06 318/432 |
| 9,046,097 B2 * | 6/2015 | Scotti Del Greco | . | F04D 27/001 |
| 9,089,635 B2 * | 7/2015 | Reichenbach | ...... | A61M 1/1086 |
| 9,181,954 B2 * | 11/2015 | Ahonen | ............... | F04D 15/0088 |
| 9,382,903 B2 * | 7/2016 | Ahola | ..................... | F04B 49/00 |
| 9,556,874 B2 * | 1/2017 | Kidd | ...................... | F04D 13/08 |
| 2002/0096219 A1 * | 7/2002 | Frasure | ............... | F04D 15/0066 137/565.13 |
| 2007/0150113 A1 * | 6/2007 | Wang | .................... | G05D 7/0641 700/282 |
| 2007/0185661 A1 * | 8/2007 | Venkatachari | ...... | F04D 15/0088 702/45 |
| 2009/0099687 A1 * | 4/2009 | Nordling | ................... | B65C 9/42 700/230 |
| 2009/0248213 A1 * | 10/2009 | Gotoh | .................. | G05D 7/0635 700/282 |
| 2010/0312398 A1 * | 12/2010 | Kidd | .................. | F04D 15/0066 700/282 |
| 2011/0200454 A1 * | 8/2011 | Ahonen | ................ | F04D 27/001 417/45 |
| 2012/0251292 A1 * | 10/2012 | Tamminen | ............ | F04D 27/001 415/1 |
| 2013/0108473 A1 * | 5/2013 | Tamminen | .............. | F04B 49/00 417/3 |
| 2013/0216407 A1 * | 8/2013 | Rasmussen | ......... | F04D 15/0033 417/410.1 |
| 2013/0289781 A1 * | 10/2013 | Kallesoe | ................ | F04D 13/14 700/282 |
| 2014/0044560 A1 * | 2/2014 | Komatsu | ................ | F04D 15/0066 417/19 |
| 2015/0293505 A1 * | 10/2015 | Acosta Gonzalez | ... | F04D 27/00 700/29 |

FOREIGN PATENT DOCUMENTS

| | | | | |
|---|---|---|---|---|
| GB | 2 124 304 A | | 2/1984 | |
| GB | 2124304 A | * | 2/1984 | ......... F04D 15/0066 |
| WO | 2012/095249 A1 | | 7/2012 | |

* cited by examiner

Fig. 10

ENHANCED METHOD FOR CONTROLLING A PUMPING STATION WITHIN A FLUID CIRCULATION SYSTEM, RELATED CIRCULATION SYSTEM AND PUMPING STATION FOR REALIZING SAID METHOD

CROSS-REFERENCE TO RELATED APPLICATIONS

The present application claims priority to European Patent Application No. 14425018.0, filed Feb. 25, 2014, the entirety of which is incorporated herein by reference.

FIELD OF APPLICATION

The present invention relates, according to its more general aspect, to a method for automatically controlling a pumping station in a fluid circulation system.

In particular, the method may find a useful application in the regulation of pumping stations provided with one or more circulators, preferably in the context of heating and/or cooling systems where the flowrate of a heat transfer fluid is controlled by means of one or more control valves.

The method may also be used for controlling said stations in fluid distribution systems intended for different purposes, for example for distributing drinking water or gas.

The present invention relates furthermore to a pumping station and a fluid circulation system suitable for realizing an automatic regulation method.

As mentioned above, the invention concerns therefore in particular the sector of heating systems and the related pumps or circulators. In more general terms, the invention concerns the technological sector of fluid distribution/circulation systems and regulation thereof.

PRIOR ART

As mentioned above, there are numerous fluid distribution/circulation systems which must regulate automatically the pumping station (or circulator) in order to adapt to the variations of the circulating flow.

One example relates to heating and/or cooling systems in which the ambient temperature is modified by means of one or more flow regulation valves. An installation of this type, shown in FIG. 1, has two zone valves 3 controlled by a corresponding number of thermostats 4 which regulate the flowrate along two branches of the system intended to heat different living areas (e.g. daytime zone and night-time zone). The flowrate set by the zone valves 3 defines the overall flowrate supplied by the pumping station 2 (or by the circulator 20) and the consequent working point on the Q-H curve.

Traditionally, the pumping station 2 was set to adapt to the variations in flowrate, while maintaining a constant head; more recently, for the sake of efficiency, it has been preferred to set proportional, increasing, driving curves, therefore requiring lower heads for low flowrate levels.

In some cases, in an attempt to achieve an even greater energy saving during stable pump operation, systems have been proposed where the driving curve is modified depending on a statistical analysis of the maximum and minimum flowrates required by the system. Such a system is for example described in the international patent application WO 2012/095249 A1.

The aforementioned methods, and in particular those which adapt the driving curve to the history of the system, while satisfying substantially the requirements of the sector, nevertheless have a number of drawbacks.

In particular, the statistical analysis results in relatively long times for correction of the operating modes of the circulator; the improvement in the energy performance is therefore perceivable only in the long term during continuous and uniform operating conditions of the system.

The technical problem underlying the present invention is therefore that of devising a method for automatically controlling the pumping station in fluid circulation systems which further reduces the consumption levels, while maintaining stable operation.

SUMMARY OF THE INVENTION

The aforementioned technical problem is solved by a method for automatically controlling a pumping station of a fluid circulation system provided with one or more flowrate control valves, comprising the following preliminary step:

predefining a plurality of driving curves which define the relationship between head and flowrate of the pumping station;

and the following adaptive control steps which are cyclically repeated:

driving the pumping station in accordance with a set curve chosen from among the predefined driving curves;

monitoring over time the variation in flowrate of fluid circulating within the system at the pumping station, or a parameter related thereto;

checking whether, during the monitoring step, the variation in flowrate exceeds or falls below a control threshold and whether said condition is maintained for a stabilization time, identifying in this case an increased flowrate condition or reduced flowrate condition, respectively;

if, during this latter check step, an increased or decreased flowrate condition is identified, modifying the set driving curve, replacing it with another curve from the plurality of driving curves;

when the step of modifying the set driving curve is performed, reinitializing the monitoring step from a new working point reached by the pumping station.

The aforementioned method, by resetting the driving curve as a direct response to the variation in flowrate, allows immediate adaptation to the conditions of the system, namely a dynamic and efficient adaptive control system. On the other hand, the stability of the system is ensured by the stabilization time which is sufficiently long to allow stabilization of the flow in the event of operation of one or more of the flowrate control valves.

The stabilization time, in a normal-size domestic heating system, may have a duration preferably of more than 10 minutes and preferably less than 30 minutes; for example it may be chosen as being equal to 20 minutes.

The control threshold is obviously positive for identification of the increased flowrate condition, and negative for identification of the reduced flowrate condition. The two control thresholds are preferably equal in terms of absolute value.

The thresholds must obviously be defined depending on the dimensions and characteristics of the system; in the case of a standard size domestic system, the threshold may be approximately between 200 l/h and 400 l/h (preferably 300 l/h).

The aforementioned predefined driving curves may be ordered with an increasing progression from a lower driving curve to a higher driving curve, each driving curve in between them defining, along at least one section thereof, head values, for the same flowrate, higher than those of the driving curve preceding it in the progression and, along at least one section thereof, head values, for the same flowrate, lower than those of the driving curve following it in the progression.

The driving curves may obviously assume different profiles, as known to the person skilled in the art; for example they may consist of proportional or quadratic functions, and may also be defined in the Q-H plane by broken or mixed lines.

Preferably, the predefined driving curves are proportional curves, namely increasing linear curves in the Q-H plane; in particular, the successive curves (from the bottom to the top) of the group of predefined driving curves may have an inclination gradually increasing along the x axis.

The aforementioned step of modifying the set driving curve may involve the following steps:

if, during the last check step, an increased flowrate condition has been identified, replacing, if possible, the set driving curve with a successive driving curve (namely a driving curve situated above it in the Q-H plane);

if, during the last check step, a reduced flowrate condition has been identified, replacing, if possible, the set driving curve with a preceding driving curve (namely a driving curve lying below it in the Q-H plane).

In particular, the respectively successive and preceding driving curves selected during the substep of replacing the set driving curve may be, respectively, the immediately successive and immediately preceding driving curves (namely the curves situated immediately above and immediately below) in the progression with respect to the set curve.

As a result of the movement towards a higher curve in the case of an increase in the flowrate, and towards the lower curve in the case of a reduction, it is possible to optimize the performance characteristics of the system, defining a feedback control system which tends towards an ideal curve for the effective circulating flowrate.

The method may also comprise the following control steps which are cyclically repeated:

if a wait time lapses without the set driving curve being modified, modifying the driving curve in accordance with one of the following alternative substeps:

if, during the last modification of the set driving curve, the previously set driving curve has been replaced with a successive driving curve which is currently set, replacing if possible the currently set driving curve with a yet successive driving curve (preferably the curve immediately following the set curve);

if, during the last modification of the set driving curve, the previously set driving curve has been replaced with a preceding driving curve which is currently set, replacing if possible the currently set driving curve with a yet preceding driving curve (preferably the curve immediately preceding the set curve);

The further control steps described above aim to prevent the system from becoming stabilized on a driving curve which is not optimal, preferring to ensure operation of the system between two curves which surround the ideal working point.

In stationary flowrate conditions—namely when the variations are below the threshold—in fact, the aforementioned conditions induce the system to amplify the last correction, until an inversion in the sign of the flowrate variation occurs, with consequent return to the preceding curve.

Again to the same end, the aforementioned step of modifying the driving curve upon lapsing of the wait time may also comprise the following substep, as an alternative to the preceding substeps:

if, from the time of activation of the adaptive control or last starting of the system, no modifications of the set driving curve have been performed, replacing the set driving curve with a successive driving curve (preferably the curve immediately following the set curve).

As a result of this further decisional step it is possible to modify the driving curve also in the absence of a historical reference point acquired during prior operation.

When the driving curve is modified upon lapsing of the wait time, it is obviously preferable to reinitialize the monitoring step starting from the new working point reached by the pumping station.

The method may also comprise the following step:

when said step of modifying the driving curve upon lapsing of the wait time is performed, incrementing the variable of the wait time by an additional time;

when, during the identification and check steps, an increase or a reduction in the flowrate maintained over time is identified, reinitializing the variable of the wait time to an initial value.

In this way, again to the advantage of the system stability, the wait time in stationary conditions is gradually prolonged the longer the system remains in these conditions and is then reset to the initial value upon detection of a new variation in the flowrate.

Indicatively, the wait time may be initially equal to one hour and be incremented whenever an additional time period of two hours lapses.

The aforementioned method may also comprise a further cyclically repeated adaptive control step involving:

regulating operation in limit flowrate conditions, comprising the substeps of:

identifying a limit flowrate condition, in which the working point of the pumping station is positioned on a limit characteristic curve of the said pumping station;

if, during the preceding identification step, a limit flowrate condition is detected, checking whether said limit flowrate condition is maintained for a control time period;

if, during the preceding check step, it is established that the limit flowrate condition is maintained, replacing the set driving curve with the first predefined driving curve which is intercepted moving along the limit characteristic curve and reducing the flowrate as from the working point of the pumping station.

The aforementioned regulation of the limit flowrate conditions is such that, once the limit flowrate is reached, subsequent closing of the flowrate control valves moves the working point to the lowest of the driving curves above the head reached, allowing energy saving during this step.

The control time, in a normal size domestic heating system, may have a duration preferably of more than 10 minutes and preferably less than 20 minutes; for example it may be chosen as being equal to 15 minutes.

When the driving curve is modified as a result of reaching the limit flowrate, it is obviously preferable to reinitialize the monitoring step starting from the new working point reached by the pumping station.

In the method described above, the said parameter related to the variation in flowrate may be a parameter obtained from a measurement within the pumping station. For example, in the case where the pumping station comprises at least one circulator operated by a synchronous motor, said parameter related to the variation in flowrate may be obtained from the power consumption and the rotational frequency of said synchronous motor and in particular the ratio between said values.

The above embodiment suggested allows distributive operation of a stand-alone circulator which has internally all the components necessary for control thereof, without the need to install and connect external sensors.

In the aforementioned method, the set driving curve is preferably reset to a default driving curve each time the adaptive control procedure and/or the system is started again.

The aforementioned technical problem is also solved by a pumping station for a fluid circulation system, comprising one or more circulators and fitted with an electronic control device designed to implement the method described above.

The aforementioned technical problem is also solved by a fluid circulation system provided with one or more flowrate control valves and a pumping station, said system further comprising at least one electronic control device designed to implement the method described above.

Further characteristic features and advantages of the present invention will emerge from the description, provided hereinbelow, of a preferred example of embodiment provided by way of a non-limiting example with reference to the accompanying drawings.

DETAILED DESCRIPTION

Figure 1:
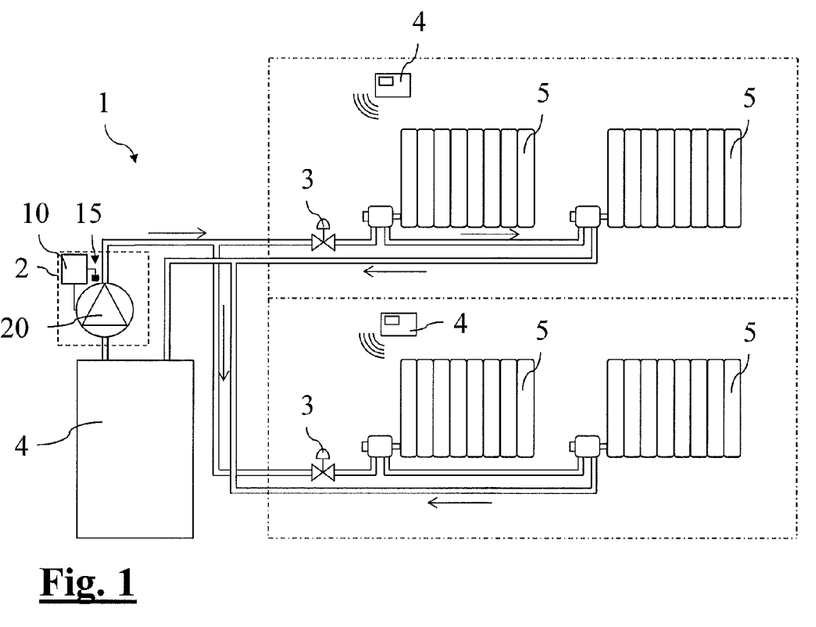
FIG. 1 shows in schematic form a heating system to which the method according to the present invention may be applied.

With reference to FIG. 1, 1 denotes generically a fluid circulation system provided with a pumping station 2 controlled using the method according to the present invention.

In the embodiment described here, purely by way of example, the system 1 is a heating system inside which a heat transfer fluid (typically water with any antifreeze additives) heated by a boiler 4 is circulated.

Circulation of the heat transfer fluid is performed by a pumping station 2 which, in the present embodiment, takes the form of a single circulator 20 consisting of a synchronous electric pump, preferably of the permanent-magnet type.

The circulation system 1 in the present example is a simple single-pipe system with zone valves; other types of circulation systems may however be used in the context of the present invention, provided that they have flowrate regulation valves.

The circulation system 1 has, in particular, two parallel branches, each of which passes through two radiators 5 intended to heat the associated zone. The flowrate in the two branches is controlled by a corresponding number of flowrate control valves 3 or automated zone valves which are operated by two thermostats 4 so as to maintain a required temperature profile within the associated zone.

The circulator 20 is provided with an electronic control device 10, for example of the type described in European patent EP 1,564,408 B1 in the name of the Applicant.

The electronic control device 10 receives at its input a signal from a Hall sensor 15 (or similar position sensor) associated with the rotor of the synchronous motor, in addition to the network synchronism signal. On the basis of these two signals, the control device 10 may calculate the rotational frequency of the circulator 20. Finally it may calculate the relation between the power consumption of the circulator 20 and the aforementioned rotational frequency, which is indicative of the working point of the circulator in the Q-H plane or the variation in flowrate $\Delta Q$.

The electronic control device 10 also comprises one or more inverters or similar electronic power elements for regulating the speed of the circulator 20.

In the light of the aforementioned characteristics, the electronic control device 10 is able to control the circulator 20, adapting to the flowrate required by the flowrate control valves 3, according to the automatic control method described below and schematically illustrated in the flow diagrams of FIGS. 10 and 11.

Figure 10:
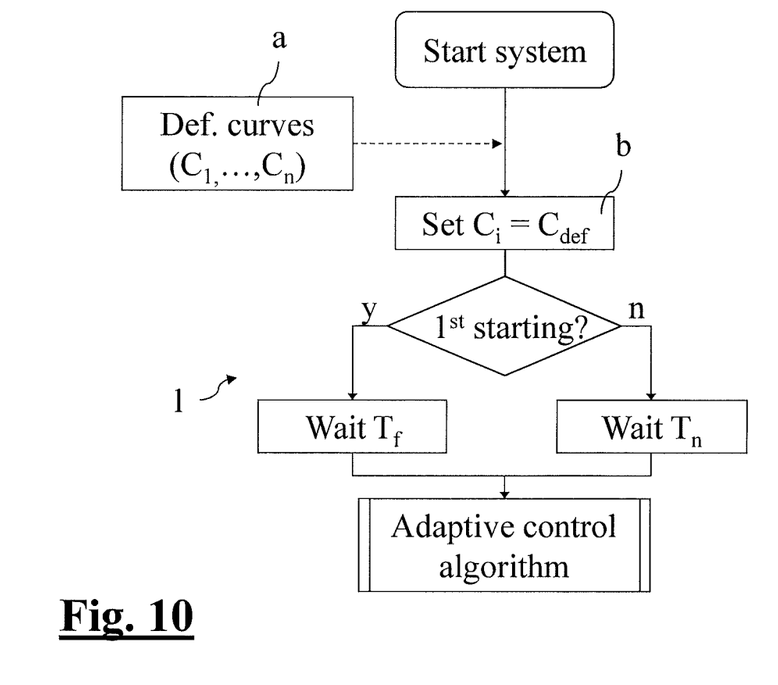
FIG. 10 shows a block diagram illustrating the method according to the present invention.
Figure 11:
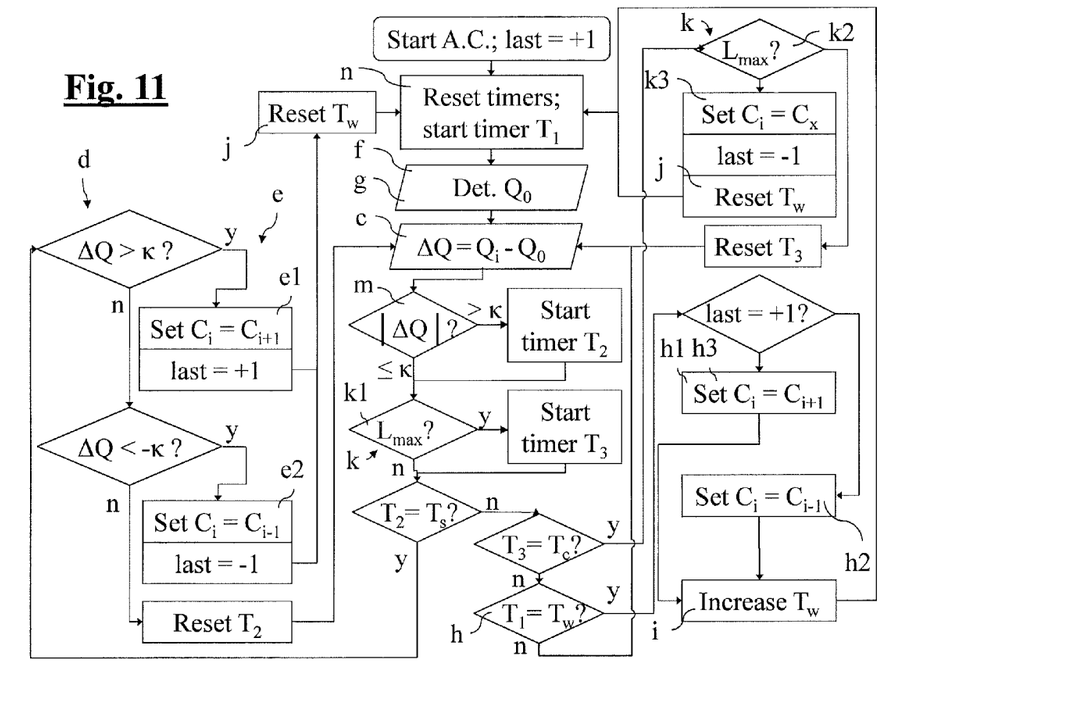
FIG. 11 shows in greater detail the block diagram of an adaptive control algorithm according to the present invention.

With reference to the flow diagrams of FIGS. 10 and 11, it can be seen how they show an example of the algorithm of the method according to the present invention; the same method may also be implemented using different algorithms.

Figure 2:
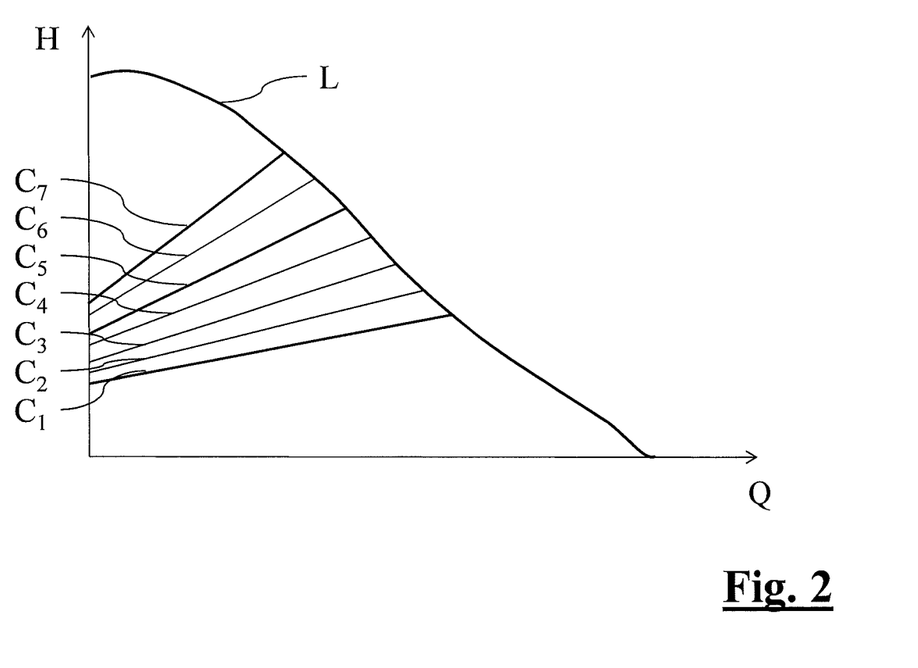
FIG. 2 shows a group of driving curves in the Q-H plane adopted by the method according to the present invention.

The method according to the present invention comprises a preliminary step, identified by "a" in the diagram of FIG. 10, involving predefining a group of driving curves $C_1, \ldots, C_7$, shown in FIG. 2, each of said curves defining a relationship between the flowrate and head of the circulator 20 in the Q-H plane.

The driving curves $C_1, \ldots, C_7$ are preferably stored in the electronic control device 10 by the manufacturer during production of the circulator 20.

The electronic control device 10, after selecting one of the driving curves $C_1, \ldots, C_7$, drives the circulator 20 so as to maintain the relationship between flowrate and head defined by the said curve, until a limit characteristic curve L which defines the operating limits of the device is reached.

It can be noted that, when the limit characteristic curve L is reached, a further increase in the flowrate required of the system necessarily produces a reduction in the head.

In the preferred embodiment described here, the driving curves $C_1, \ldots, C_7$ are linear and increasing, namely define a relationship of direct proportionality between flowrate and head where an increase in the former results in a corresponding increase of the latter.

The driving curves $C_1, \ldots, C_7$ are ordered in an increasing progression from a bottom driving curve $C_1$ to a top driving curve $C_7$, where each curve is arranged above the successive curve in the Q-H plane.

The gradient of the curves, namely the inclination with respect to the y axis, increases gradually from the bottom driving curve $C_1$ until it reaches the top driving curve $C_7$.

In the present example, the driving curves $C_1, \ldots, C_7$ are seven in number and are identified by the lower and upper end values which are shown in the table below.

|  | $Q_{min}$ (l/h) | $H_{min}$ (m) | $Q_{max}$ (l/h) | $H_{max}$ (m) |
| --- | --- | --- | --- | --- |
| Curve $C_1$ | 0 | 1 | 2600 | 2 |
| Curve $C_2$ | 0 | 1.2 | 2400 | 2.4 |
| Curve $C_3$ | 0 | 1.4 | 2200 | 2.8 |
| Curve $C_4$ | 0 | 1.6 | 2000 | 3.2 |
| Curve $C_5$ | 0 | 1.8 | 1800 | 3.6 |
| Curve $C_6$ | 0 | 2 | 1600 | 4 |
| Curve $C_7$ | 0 | 2.2 | 1400 | 4.4 |

When the system 1 is switched on, the present method comprises a step, identified by "b" in FIG. 10, of driving the circulator 20 in accordance with one of the predefined driving curves $C_1, \ldots, C_7$; in particular, in accordance with a default curve $C_{def}$ which in the present case is the driving curve $C_5$.

This is followed by a wait step, generically indicated by 1, during which the circulator 20 is controlled in accordance with the default curve $C_{def}$ for a predetermined period: a first, longer, starting time $T_f$, in the case where the system 1 is started for the first time; a standard starting time $T_n$ for all the subsequent starting operations. In the first case, the wait time allows installation and venting of the system 1; in the second case, it merely allows the system to be stabilized.

In the preferred embodiment described here the first starting time $T_f$ is equal to 90 minutes and the standard starting time $T_n$ is equal to 30 minutes.

Once the wait step has terminated, the method according to the present invention then executes the actual adaptive control algorithm illustrated in the flow diagram of FIG. 11.

Preferably the adaptive control does not memorize the settings and variables implemented during the previous sessions. In other words, whenever the adaptive control is restarted—owing to renewed start-up of the system 1 or a specific regulation by the user—it starts again from the predefined default curve $C_{def}$, ignoring the previously performed regulating operations.

In the algorithm currently illustrated, a first step "n" performs zeroing of the various counters or timers, the function of which will emerge clearly from the present description below, and starting of a first timer $T_1$ intended to monitor the amount of time which has lapsed since the last modification of the set driving curve $C_i$.

The method further has a step "g" for defining a parameter for identifying a parameter indicating the flowrate at an initial working point and a following step—indicated by "c"—for effective monitoring over time of the variation in flowrate $\Delta Q$ of the fluid circulating in the system 1 at the pumping station 2, or a parameter related thereto. The variation in flowrate $\Delta Q$ is assessed with reference to the previously defined initial working point.

In the present example, the initial working point is defined at the time of initial execution of the adaptive control algorithm; it is obviously possible to identify beforehand this initial working point, for example upon start-up of the system.

As seen above, in the present embodiment the parameter monitored is the ratio between power consumption $P_{ass}$ and frequency of rotation f of the circulator 20, this ratio being indicative of the variation in flowrate $\Delta Q$. For the sake of easier illustration, in the description below reference will always be made in any case to the variation in flowrate $\Delta Q$ as control parameter; the person skilled in the art will obviously understand how the method may be realized in an identical manner using the other control parameter $P_{ass}/f$ or other parameters related to the flowrate.

The adaptive control algorithm according to the present invention envisages a series of cyclically repeated control steps.

A first control is obviously carried out as to the variation in flowrate $\Delta Q$ detected in real time.

This control envisages, during a first check step generically indicated by "d", evaluating whether the variation in flowrate $\Delta Q$ has exceeded an upper control threshold κ or has fallen below a lower control threshold −κ and whether said condition is maintained for a stabilization time $T_s$.

Given that in the present example the two control thresholds have been chosen identical in terms of absolute value, the algorithm in FIG. 11 shows a preliminary checking operation "m" as to the absolute value of the variation in flowrate $\Delta Q$ which starts a timer $T_2$ in the event of a positive outcome.

When the timer $T_2$ reaches the required stabilization time $T_s$, the actual check step is started in order to establish whether the variation in flowrate has remained above or below the upper control threshold κ or lower control threshold −κ.

In the event of a positive outcome of one of the two checks, an increased flowrate condition S+ or a reduced flowrate condition S− is identified.

If neither of the two checks has a positive outcome, the variation in flowrate $\Delta Q$ has not been maintained over time and the timer T will be zeroed, which will be started again upon subsequent detection of the threshold being exceeded.

If, on the other hand, one of the two checks has a positive outcome, a step for modifying the driving curve, generically indicated by the letter e, is carried out.

If, in particular, the checks identify an increased flowrate condition S+, a first modification substep e1 is carried out for replacing the previously set driving curve with the immediately successive or higher driving curve, unless the set driving curve is already the maximum driving curve $C_7$.

It is envisaged moreover recording in a specific variable that the last control operation carried out consists in an increase in the driving curve (value +1 of the variable "last" in the algorithm of FIG. 11).

Figure 3:
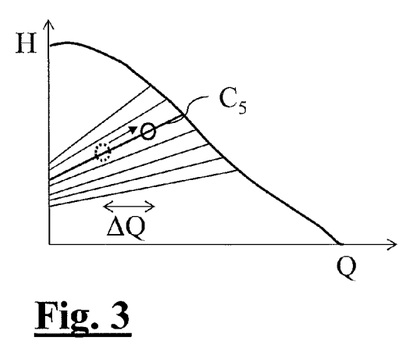
FIGS. 3 and 4 show an increased flowrate condition in the method according to the present invention.
Figure 4:
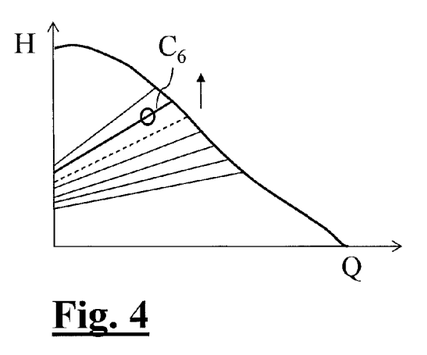

The increased flowrate condition S+ is illustrated by way of example in the attached FIG. 3, in which the working point of the circulator 20 moves along the driving curve $C_5$. The modification substep e1 then envisages setting the successive driving curve $C_6$, as shown in the following FIG. 4.

If the aforementioned checks identify a reduced flowrate condition S−, a second modification substep e2 is carried out, as an alternative to the first modification substep e1, which replaces the previously set driving curve with the immediately preceding or lower driving curve, unless the set driving curve is already the minimum driving curve $C_1$.

It is envisaged moreover recording in a specific variable that the last control operation carried out consists in a reduction of the driving curve (value −1 of the variable "last" in the algorithm of FIG. 11).

Figure 5:
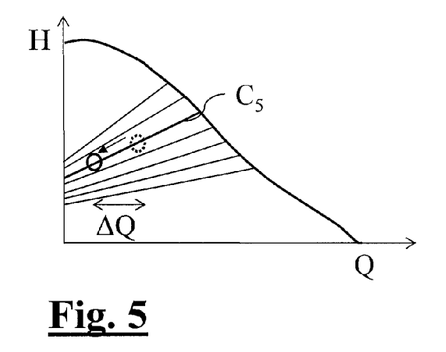
FIGS. 5 and 6 show a reduced flowrate condition in the method according to the present invention.
Figure 6:
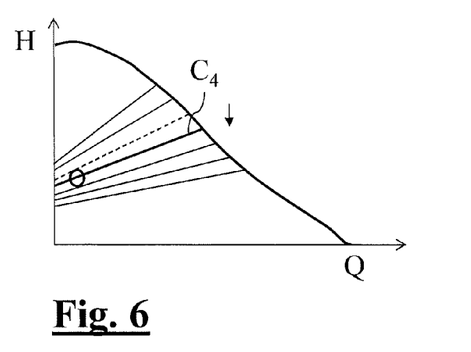

The reduced flowrate condition S− is illustrated by way of example in the attached FIG. 5, in which the working point of the circulator 20 moves with a reduction in the flowrate along the driving curve $C_5$. The modification substep e2 then envisages setting the preceding driving curve $C_4$, as shown in the following FIG. 6.

In both the cases illustrated above, after modifying the driving curve, in a step "j" resetting of a time variable $T_w$ (wait time) to an initial value $T_0$ is performed. The function of this reset operation will become clearer from the description below.

The step "n" is then repeated, this performing zeroing of the various system timers and restarting of the first timer $T_1$ which monitors the time which has lapsed since the last modification of the set driving curve $C_i$.

Finally, in a step f, monitoring of the variation in flowrate $\Delta Q$ is reinitialized, starting from the new working point reached by the circulator 20, following the variation in the driving curve.

The stabilization time $T_s$ required for validation of the increased or reduced flowrate condition S+ or S− is that necessary for stabilization of the flowrate control valves 3 of the system 1. In the present example, an indicative value of 20 minutes has been assigned to this stabilization time.

The variation in flowrate which triggers activation of the control operation, or the control threshold |κ|, has been chosen in the present example as being equal indicatively to 300 l/h.

A second control k, performed in real time, relates to reaching of the limit characteristic curve L by the circulator 20. As previously mentioned, an excessive flowrate demand causes the circulator 20 to operate in the region of a curve which represents the limit of its working area; a further increase in the flowrate thus results in a reduction of the head.

The aforementioned control operation envisages a first substep k1 in which reaching of the limit characteristic curve L is identified. The limit characteristic curve L may be acquired experimentally and stored in the electronic control device or reaching of said limit may be detected when the working point of the pump deviates from the set driving curve $C_i$.

A following substep k2 involves checking whether the system remains in the limit condition for a control time $T_c$, to which the indicative value of 15 minutes has been assigned in the present example.

In the control algorithm shown in FIG. 11, the duration control consists in starting of a third timer $T_3$ and a subsequent check of to its value.

When it is established that the circulator is working along the limit characteristic curve L for a control time $T_c$, a third substep k3 for modifying the set driving curve is performed.

The set driving curve $C_i$ is in fact replaced with a lower set driving curve. In particular, the driving curve which is situated most closely above the current working point of the circulator 20 is selected from among the predefined driving curves $C_1, \ldots, C_7$. Thus, when the flowrate is reduced, the working point moves along said curve, avoiding moving back up to the previously set curve.

It is envisaged moreover recording in a specific variable that the last control operation carried out consists in a reduction of the driving curve (value −1 of the variable "last" in the algorithm of FIG. 11).

Figure 7:
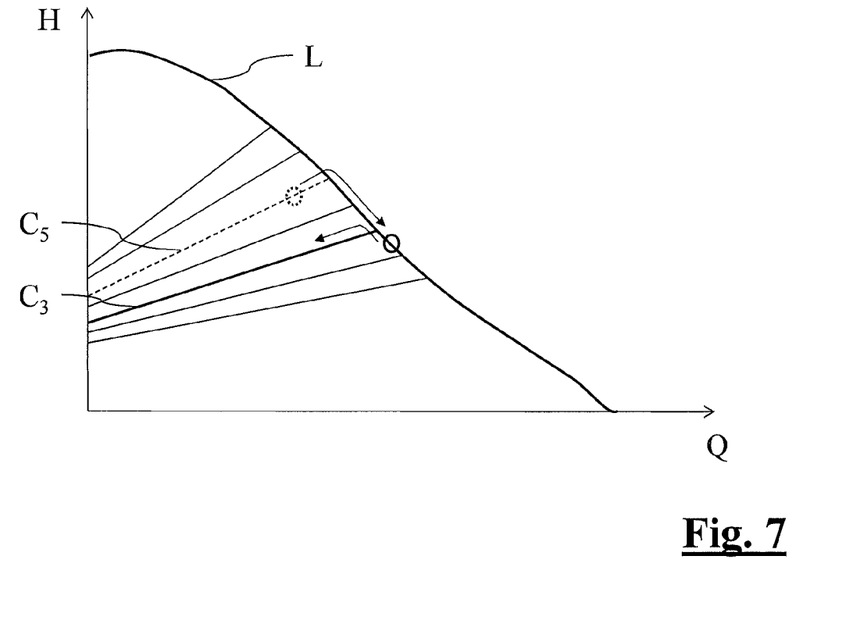
FIG. 7 show a limit flowrate condition in the method according to the present invention.

The working condition along the limit curve is shown by way of example in the attached FIG. 7, in which the working point of the circulator 20 moves along the limit characteristic curve L exiting from the set driving curve $C_5$. The modification substep k3 thus sets the preceding driving curve $C_5$ along which the working point will move when there is a reduction in the flowrate circulating within the system 1.

After modifying the driving curve, in a step "j" resetting of a time variable $T_w$ (wait time) to an initial value $T_0$ is performed. The function of this reset operation will become clearer from the description below.

The step "n" is then repeated, this performing zeroing of the various system timers and restarting of the first timer $T_1$ which monitors the time which has lapsed since the last modification of the set driving curve $C_i$.

Finally, in a step "f" monitoring of the variation in flowrate $\Delta Q$ is reinitialized, starting from the new working point reached by the circulator 20, following the variation of the driving curve.

A third control operation "h", carried out in real time, identifies when the time which has lapsed since the last variation in the driving curve (namely the first timer $T_1$) reaches a wait time $T_w$.

Figure 8:
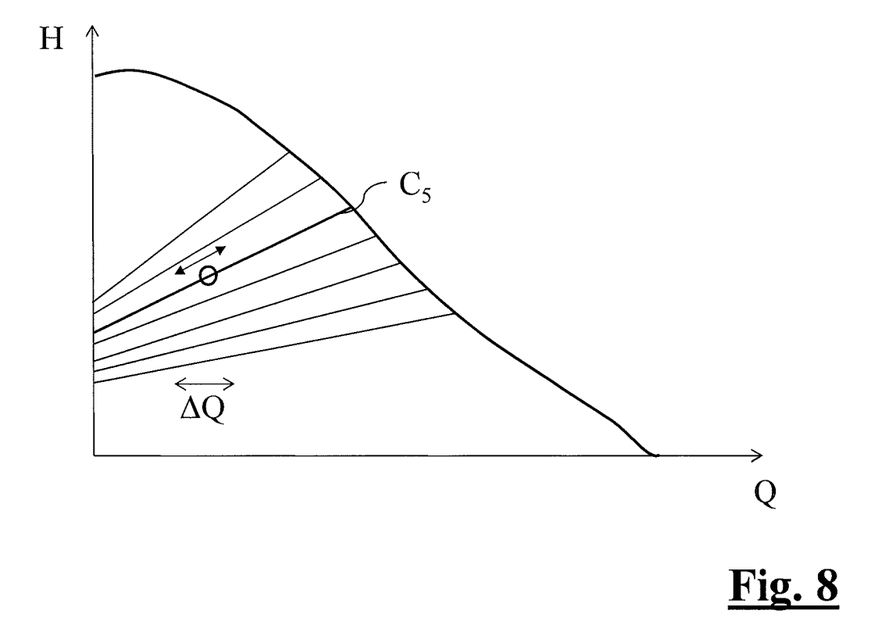
FIG. 8 show a stationary flowrate condition in the method according to the present invention.

Such a control operation identifies a substantially stationary condition with the working point displaced from the limit characteristic curve L. Such a condition is visually shown in FIG. 8 where the driving curve set is an intermediate curve $C_5$.

In this condition the electronic control device 10 forces a modification of the driving curve, performing one of the following alternative substeps.

A first substep h1, which replaces the set driving curve $C_i$ with the immediately higher curve, is performed if, during the last modification of the driving curve, the previously set driving curve has been replaced by a successive (i.e. higher) driving curve. In the algorithm in FIG. 11 this condition is represented by a value +1 of the variable "last".

A second substep h2, which replaces the set driving curve $C_i$ with the immediately lower curve, is performed if, during the last modification of the driving curve, the previously set driving curve has been replaced with a preceding (i.e. lower) driving curve. In the algorithm in FIG. 11 this condition is represented by a value −1 of the variable "last".

Finally, a substep h3 is envisaged for the case where the driving curve has not yet been modified by initialization of the adaptive control algorithm. In this case, it is decided to replace the default driving curve $C_{def}$ (namely $C_5$) with the immediately higher curve ($C_6$).

In the algorithm shown in FIG. 11, the variable "last" is set to +1 upon starting of adaptive control and the substep h3 coincides with the substep h1.

When the set driving curve $C_i$ is modified in response to reaching of the wait time $T_w$, this wait time is then incremented. Thus, it is necessary to wait a longer time before possible continuation of the stationary condition causes further raising/lowering of the driving curve. As previously seen, the initial value $T_0$ of the time variable $T_w$, is reset as soon as modification of the driving curve $C_i$ is performed in response to a variation in flowrate S+, S− or when the limit characteristic curve L is reached.

The step of incrementing the value of the wait time $T_w$ is indicated by "I" in the flow diagram shown in FIG. 11.

By way of example, for a wait time $T_w$ initially a value $T_0$ equal to one hour is chosen, and with each successive increment an additional time $T_s$ equal to two hours is added.

Figure 9:
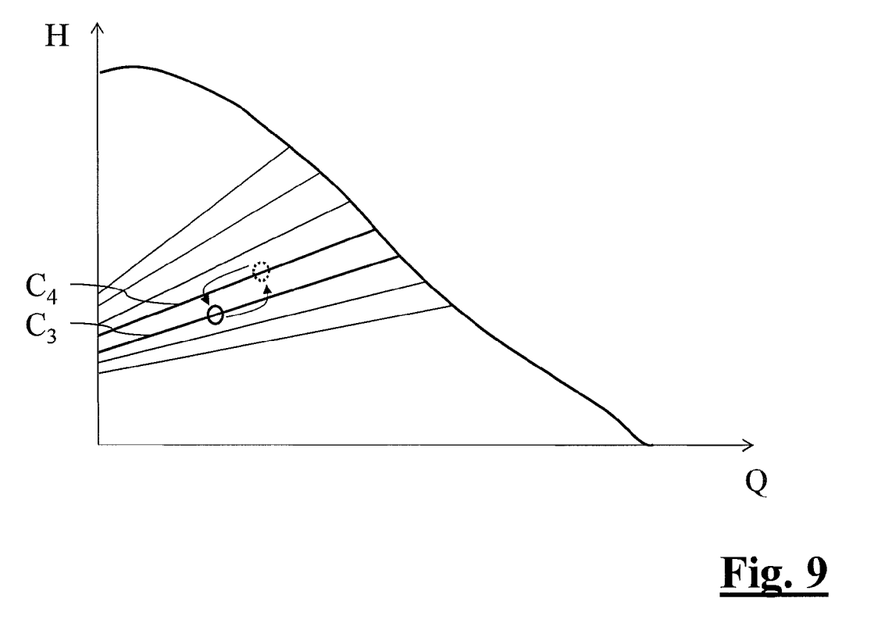
FIG. 9 show a general operating condition in the method according to the present invention.

It should be noted that, ideally, in a stationary or near-stationary operating condition of the system 1, two or more successive driving curves should be cyclically adopted, as shown in FIG. 9.

In fact, the third control step "h" amplifies the last response of the system, increasing or decreasing gradually the driving curve $C_i$ in accordance with the last variation performed. The displacement of the working point along the successive driving curves causes sooner or later a variation in flowrate $\Delta Q$ so as to give rise to a regulation with an opposite sign. The new regulation causes again a displacement of the working point and therefore a variation in flowrate $\Delta Q$ of opposite sign, which should be sufficient to cause a return to the previously set flowrate curve (otherwise, the control operation under stationary conditions continues in the same direction, until an ΔQ which causes reversal is reached).

In the case of no regulation of the system 1 (no variation in the flowrate), the electronic control device 10 may envisage a specific control condition where, after about 3½ hours from starting of the circulator 20 without detection of flowrate changes, it works with a maximum driving curve $C_7$.

Obviously the person skilled in the art may make numerous modifications and variations to the method and device described above, all of which moreover are contained in the scope of protection of the invention, as defined by the following claims.

The invention claimed is:

1. A method for automatically controlling a pumping station of a fluid circulation system provided with one or more flowrate control valves, comprising the following preliminary step:

predefining a plurality of predefined driving curves which define relationships between head and flowrate of the pumping station, wherein said predefined driving curves are ordered with an increasing progression from a lower predefined driving curve to a higher predefined driving curve, each predefined driving curve in between them defining, along at least one section thereof, head values, for the same flowrate, higher than those of the predefined driving curve preceding it in the progression and, along at least one section thereof, head values, for the same flowrate, lower than those of the predefined driving curve following it in the progression;

and the following adaptive control steps which are cyclically repeated:

driving said pumping station in accordance with a set predefined curve chosen from among the predefined driving curves;

monitoring over time the variation in flowrate of fluid circulating within the system at the pumping station, or a parameter related thereto, by calculating a ratio between power consumption and frequency of rotation of the pumping station, this ratio being indicative of the variation in flowrate;

checking whether, during the monitoring step, the variation in flowrate exceeds or falls below a control threshold and whether said condition is maintained for a stabilization time, identifying in this case an increased flowrate condition or reduced flowrate condition, respectively;

if, during this latter checking step, an increased flowrate condition or reduced flowrate condition is identified, modifying the set predefined driving curve, replacing it with another predefined curve from the plurality of predefined driving curves, said step of modifying the set predefined driving curve including the following substeps:

if, during the last checking step, an increased flowrate condition has been identified, replacing the set predefined driving curve with a successive predefined driving curve, if any;

if, during the last checking step, a reduced flowrate condition has been identified, replacing the set predefined driving curve with a preceding predefined driving curve, if any;

when the step of modifying the set predefined driving curve is performed, reinitializing the monitoring step from a new flowrate working point reached by the pumping station.

2. The method according to claim 1, wherein the respectively successive and preceding predefined driving curves selected during the substep of replacing the set predefined driving curve are, respectively, the immediately successive and immediately preceding predefined driving curves in the progression with respect to the set predefined driving curve.

3. The method according to claim 1, further comprising the following adaptive control steps which are cyclically repeated:

if a wait-time lapses without the set predefined driving curve being modified, modifying the predefined driving curve in accordance with one of the following alternative substeps:

if, during the last modification of the set predefined driving curve, the previously set predefined driving curve has been replaced with a successive predefined driving curve which is currently set, replacing if possible the currently set predefined driving curve with a yet successive predefined driving curve;

if, during the last modification of the set predefined driving curve, the previously set predefined driving curve has been replaced with a preceding predefined driving curve which is currently set, replacing if possible the currently set predefined driving curve with a yet preceding predefined driving curve.

4. The method according to claim 3, wherein said step of modifying the predefined driving curve when the wait time lapses further comprises the following substep, as an alternative to the preceding steps:

if, from the time of activation of the adaptive control or from last starting of the system, no modifications of the set predefined driving curve have been performed, replacing the set predefined driving curve with a successive predefined driving curve.

5. The method according to claim 3, wherein the respectively successive and preceding predefined driving curves selected during the alternative substeps of the step for modifying the predefined driving curve when the wait time lapses are, respectively, the immediately successive and immediately preceding predefined driving curves in the progression with respect to the set predefined driving curve.

6. The method according to one of claim 3, further comprising the following step:

when said step of modifying the predefined driving curve upon lapsing of the wait time is performed, incrementing the variable of the wait time by an additional time;

when, during the identification step and check step, an increase or a reduction in the flowrate maintained over the time is identified, reinitializing the variable of the wait time to an initial value.

7. The method according to claim 1, further comprising an adaptive control step which is cyclically repeated, of:

regulating operation in limit flowrate conditions, comprising the substeps of:

identifying a limit flowrate condition, in which the working point of the pumping station is positioned on a limit characteristic curve of the said pumping station;

if, during the preceding identification step, a limit flowrate condition is detected, checking whether said limit flowrate condition is maintained for a control time period;

if, during the preceding check step, the limit flowrate condition is maintained, replacing the set predefined driving curve with the first predefined driving curve which is intercepted moving along the characteristic limit curve and decreasing the flowrate from the working point of the pumping station.

8. The method according to claim 1, wherein said predefined driving curves are proportional curves, namely linear curves increasing in the Q-H plane.

9. The method according to claim 8, wherein said predefined driving curves have an inclination progressively increasing along the x axis of the Q-H plane.

10. The method according to claim 1, wherein said parameter related to the variation in flowrate is a parameter obtained from a measurement inside the pumping station.

11. The method according to claim 10, wherein said pumping station comprises at least one circulator operated by a synchronous motor, said parameter related to the variation in flowrate being obtained from the power consumption and the rotational frequency of said synchronous motor.

12. The method according to claim 1, where the set predefined driving curve is reset to a default predefined driving curve whenever the adaptive control is started again.

13. A pumping station for a fluid circulation system, comprising one or more circulators and fitted with an electronic control device designed to implement the method according to claim 1.

14. A fluid circulation system provided with one or more flowrate control valves and a pumping station, said system further comprising at least one electronic control device designed to implement the method according to claim 1.

* * * * *